April 5, 1960

D. L. MARKUSEN 2,931,901

NONLINEAR CONTROL APPARATUS

Filed Dec. 1, 1954

INVENTOR
DAVID L. MARKUSEN

BY George H. Fisher

ATTORNEY

April 5, 1960 D. L. MARKUSEN 2,931,901
NONLINEAR CONTROL APPARATUS
Filed Dec. 1, 1954 2 Sheets-Sheet 2
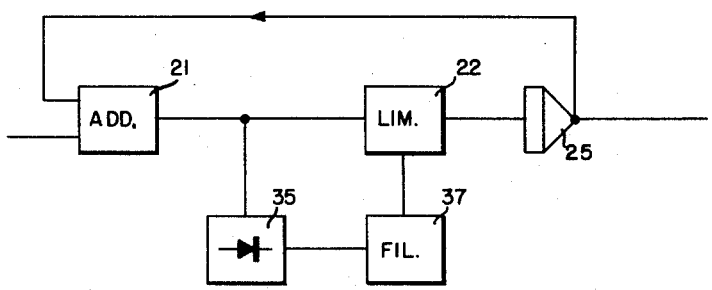
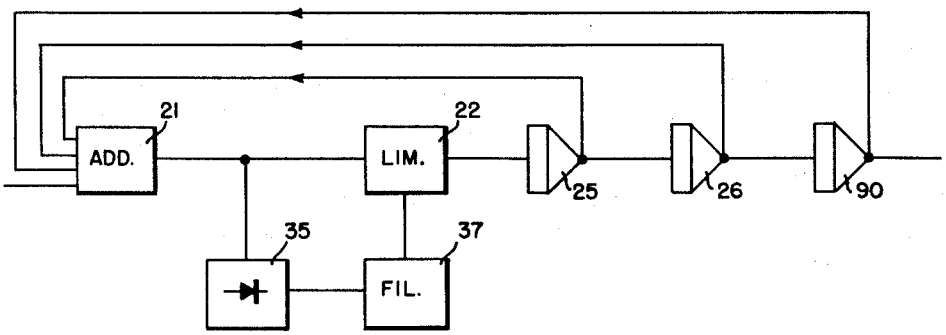
INVENTOR.
DAVID L. MARKUSEN
BY George H. Fisher
ATTORNEY 400
United States Patent Office 2,931,901
Patented Apr. 5, 1960

2,931,901
NONLINEAR CONTROL APPARATUS

David L. Markusen, Minneapolis, Minn., assignor to Minneapolis-Honeywell Regulator Company, Minneapolis, Minn., a corporation of Delaware Application December 1, 1954, Serial No. 472,319

4 Claims. (Cl. 250—27)

This invention relates to the general field of instrumentation, and more particularly to apparatus used for automatic indication or control of a condition by means of electrical signals.

In the field of electrical control apparatus it is conventional to provide a condition responsive transducer or pickoff which operates to give an electrical signal varying in amplitude with a condition to be controlled. Although the condition may vary in an irregular fashion, it is possible by the principles of Fourier analysis to determine the significant frequency components in its variation and thus to establish a band of frequencies to which any control system must be responsive if the system is to operate satisfactorily.

It is found in practice that electrical signals of this sort contain components which are not representative of changes in the condition. Upon analysis such spurious or "noise" components are found to contain frequencies which may extend over a much wider band than the intelligence frequencies, and the frequency bands often overlap. The amplitudes of the noise components may also exceed those of the intelligence components, especially at low levels of the latter.

Noise components in electrical signals are detrimental to the extent that they cause system operation which is not representative of change in the condition in question. Noise components in the intelligence band of frequencies obviously have this result, but noise components outside the band may also have such an effect in various ways: an example here is the saturation of amplifiers, by noise components of large amplitude and high frequency, to such an extent that normal operation at intelligence frequencies is impossible.

If the intelligence and noise frequency bands are wholly independent they can easily be separated by simple filters. I have found that when the bands overlap, and the intelligence band is substantially lower than the noise band, closed loop filters are useful, because they operate to emphasize the frequency differences, and if nonlinearity can be introduced into a filter at a suitable point, even greater suppression of the undesired components can be accomplished.

A network which is capable of distinguishing, on the basis of frequency, for example, between the intelligence and noise components of an electrical signal, and of modifying its own transmitting nature in accordance with the magnitude of the noise component, is referred to herein as a "perception filter."

Inherent in the use of filters is the introduction of phase lag into the overall system. It is moreover generally the case that if the curve of frequency versus phase shift of a filter is substantially flat over a working range of frequencies, the filter does not cut off sharply immediately thereafter to give good adjacent frequency suppression. Certain control systems are of such a nature that little phase lag can be tolerated, and yet adequate frequency separation is necessary.

The present invention has for its object an improved condition responsive system in which the effect of noise components in an electrical signal is minimized without the introduction of excessive phase lag over the band of intelligence frequencies of the system.

It is another object of the invention to provide a condition responsive system including a perception filter which does not introduce excessive phase lag into the system. Another object of the invention is to provide a perception filter of the character just described.

A more specific object of the invention is to provide a network, including at least one limiter and one integrator, capable of distinguishing between the noise and the signal components of an input supplied thereto, and of at least partly suppressing the former components without introducing excessive phase shift.

A further specific object of the invention is to provide a perception filter including an adder whose output is fed in cascade through a variable limiter and two successive integrators to give a utilization output, wherein the inputs to the adder are the signal to the filter and voltages derived from the integrator outputs, and wherein the limits of the limiter are varied in accordance with the output of the adder.

A further specific object of the invention is to provide a perception filter as described above having an overall transfer function $$\frac{1}{S^2+2\zeta\omega_n S+\omega_n^2}$$

and an intermediate transfer function at the output of the adder of $$\frac{S^2}{S^2+2\zeta\omega_n S+\omega_n^2}$$

where $\omega_n$ and $\zeta$ are the natural frequency and the damping ratio of the filter respectively without limiting. A still further specific object of the invention is to provide a perception filter as just described having a pair of feedback loops with transfer characteristics of $-2\zeta\omega_n$ and $-\omega_n^2$ respectively.

Various other objects, advantages, and features of novelty which characterize my invention are pointed out with particularity in the claims annexed hereto and forming a part hereof. However, for a better understanding of the invention, its advantages, and objects attained by its use, reference should be had to the subjoined drawing, which forms a further part hereof, and to the accompanying descriptive matter, in which I have illustrated and described certain preferred embodiments of my invention. In the drawing:

Figures 2 and 3 are schematic showings of modifications of the perception filter of Figure 1.

Figure 1:
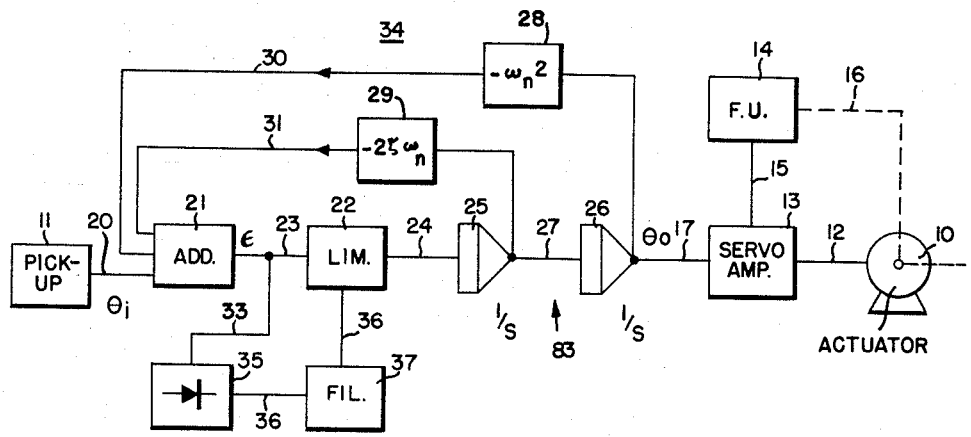
Figure 1 is a schematic showing of an electrical control system embodying the invention.

In Figure 1 there is shown a telemetric system in which an actuator 10 is provided to adjust a condition changing device in accordance with signals supplied by a pickup 11 affected by the condition. It will be evident that the condition may be temperature, aircraft attitude, or any other variable which it is desired to measure or control, and that the condition changing device may be the corresponding fuel valve, aircraft control surface or other suitable device. It is understood that actuator 10 may be connected to an indicator instead of to a condition changing device, as a special case of the system.

Actuator 10 is energized through a cable 12 from a servo amplifier 13, and if proportional control is desired a follow-up device 14 may be connected to servo amplifier 13 by a cable 15 and may be adjusted by actuator 10 through a suitable mechanical connection 16. The input signal to servo amplifier 13 is supplied along a cable 17, and the output to actuator 10 is the difference between the input and follow-up signals.

The output of pickup 11 is applied through a cable 20 to an adder 21. A limiter 22 is connected by a cable 23 to adder 21, and by a cable 24 to a first integrator 25. Integrator 25 energizes a second integrator 26 through a cable 27. The output of integrator 26 is supplied to adder 21 through a connection 30, and the output of integrator 25 is supplied to adder 21 through a connection 31. Connection 30 is shown to include gain adjusting means 28 giving it the transfer characteristic $-\omega_n^2$ and connection 31 is shown to include gain adjusting means 29 giving it the transfer characteristic $-2\zeta\omega_n$, where $\omega_n$ is the desired natural frequency of the closed loop filter 34 including elements 20–31 and $\zeta$ is the desired damping constant of filter 34 when operating in the linear region.

Also connected to adder 21 by cables 23 and 33 is a rectifier 35, the output of which is supplied to limiter 22 through a connection 36 including a filter 37, for the purpose of varying the limits of limiter 22 in accordance with the signal $\epsilon$ from the adder after modification and filtering.

If $\theta_i$ is defined as the signal on cable 20, and $\theta_o$ is defined as the signal on cable 17, then the transfer function of the closed loop filter 34, for conditions where limiter 22 is not limiting, may be shown to have the value $$\frac{\theta_o}{\theta_i}=\frac{1}{S^2+2\zeta\omega_n S+\omega_n^2} \quad (1)$$

where $S$ is the operator $j\omega$. Similarly, the transfer function between cable 20 and cable 23 has the value $$\frac{\epsilon}{\theta_i}=\frac{S^2}{S^2+2\zeta\omega_n S+\omega_n^2} \quad (2)$$

Figure 4:
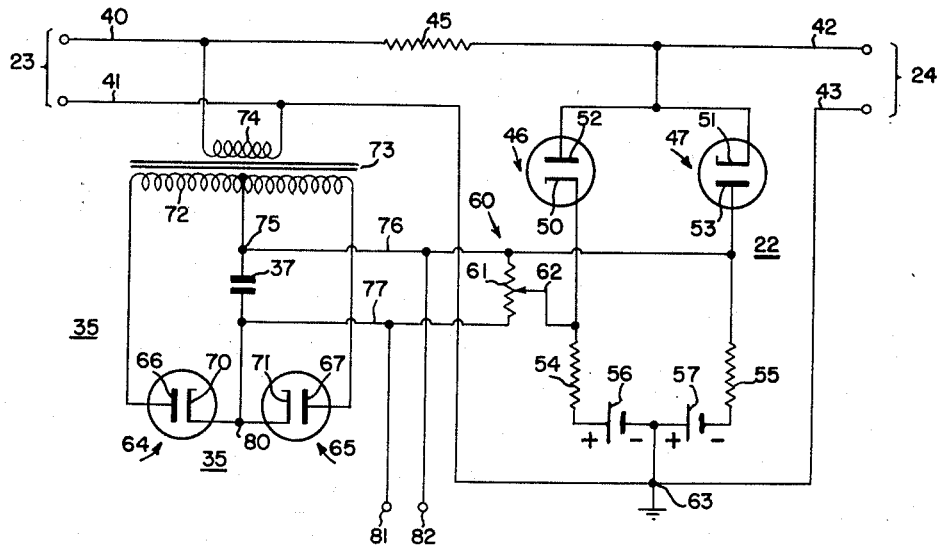
Figure 4 is a detailed wiring diagram of a portion of a perception filter according to the invention.

From Equations 1 and 2 it will be evident that as the frequency $\omega$ of an input signal of magnitude $\theta_i$ varies from zero to infinity, the signal at cable 23 varies in magnitude from zero to $\theta_i$ while the signal at 17 varied from $\theta_i/\omega_n^2$ to zero. Moreover if equal amplitude components of $\theta_i$ have a frequency ratio of say 1:4, their amplitude ratio at cable 23 is 1:16. Thus in the presence of noise components having frequencies extending several octaves above the intelligence component frequency band, which is usually the case, $\epsilon$ may be taken as substantially representing only the noise components of $\theta_i$, and as being substantially independent of the intelligence components of $\theta_i$. This voltage is rectified and filtered, and is then supplied to the limiter 22, which acts to limit the signal supplied to the input of integrator 25. The circuit is shown in detail in Figure 4, where input conductors 40 and 41 correspond to cable 23 of Figure 1 and output conductors 42 and 43 correspond to cable 24. Limiter 22 is shown to comprise a resistor 45, a pair of diodes 46 and 47 including cathodes 50 and 51 and anodes 52 and 53 and associated with resistors 54 and 55 and voltage sources 56 and 57, all respectively, and a voltage divider 60 including a winding 61 and a slider 62. The common point between sources 56 and 57 is connected to ground at 63, as are conductors 41 and 43.

Rectifier 35 is shown to comprise a pair of diodes 64 and 65 having anodes 66 and 67 and cathodes 70 and 71, respectively. Anodes 66 and 67 are energized from the secondary winding 72 of a transformer 73 having a primary winding 74 connected to conductors 40 and 41; winding 72 is center tapped at 75. The output from rectifier 35 is taken on conductors 76 and 77, between center tap 75 and the common point 80 between diodes 64 and 65, and is filtered by condenser 37 and applied across winding 61 of voltage divider 60. It may also be supplied to a pair of terminals 81 and 82 if further rectified and filtered outputs are desired. Filter 34 together with elements 35, 36 and 37 constitutes a perception filter 83. The apparatus described above functions to give, at all times, system operation with the best signal-to-noise ratio which the nature of the input signal permits. For signals with low noise levels the system limits the output on cable 23 to a relatively low value, thus giving a high effective signal-to-noise ratio: for signals with high noise levels the effective signal-to-noise ratio is reduced, by raising the level at which limiting of the output on cable 23 occurs, to the extent necessary in order to prevent the system from becoming completely unstable and hence totally inoperative. Even with reduced signal-to-noise ratio the system operation is still better than it would be without any limiter. By this arrangement it is no longer necessary to design equipment for the worst (noisiest) signals to be anticipated thereby penalizing the equipment when used for more perfect signals.

The apparatus may be set by adjustment of slider 62 so that the limiter does not conduct when the largest anticipated signal of the highest frequency in the intelligence component range is supplied by pick up 11, or it may be set so that system operation is just reliably stable under those conditions. If now larger components of any frequency, or smaller and smaller components of higher and higher frequencies, appear at 20, the amplitude of the signal at 23 increases thus increasing the voltage across the limiter and the voltage on voltage divider 60. The former effect tends to result in conduction of diode 46 or diode 47, depending on the phase of the voltage at 23, but the latter effect tends to raise the voltage level at which that conduction can begin. By this arrangement the limiter is allowed to act at as low a level as can be tolerated without compromising system stability.

Apparatus constructed as just described has been found to give a very satisfactory operation over a range from zero to 2.5 radians per second, with a phase lag varying only between about 5 and 10 degrees: by the time the frequency has reached 5 radians per second, the amplitude is 2 decibels down, and at 10 radians per second the amplitude is down 15 decibels.

A feature of the apparatus which should be particularly pointed out is that the output from limiter 22 is twice integrated. In other words, the limiter output is the second derivative of the voltage on cable 17. Thus any limiting which takes place is effective on the output not as simple limiting of the signal on cable 20, but as acceleration limiting, that is, limiting on the second derivative of the signal at 17.

Figure 2 shows a simplification of Figure 1 in which only one integrator is used. This perception filter is not as efficient in distinguishing between high and low frequencies, and since only one integrator follows the limiter there is velocity limiting, that is, limiting on the first derivative of the signal at 17 rather than acceleration limiting, but the circuit has decided advantages of simplicity where its characteristics are suitable.

A further embodiment of the perception filter is shown in Figure 3, which differs from Figure 1 in having a third integrator 90. Limiter action here is on the third derivative of the output of integrator 90.

It will be readily apparent to those skilled in the art that if it is desired to limit more than a single derivative of the output signal at the same time, a suitable number of additional limiters may be inserted at appropriate positions in the circuit.

From the foregoing description it will be evident that I have invented an improved telemetric system and a number of perception filters for use therein. Numerous objects and advantages of the invention have been set forth in the foregoing description, together with details of the structure and function of the invention, and the novel features thereof are pointed out in the appended claims. The disclosure, however, is illustrative only, and I may make changes in detail within the principle of the invention to the full extent indicated by the broad and general meaning of the terms in which the appended claims are expressed.

I claim as my invention:

1. Apparatus of the class described comprising, in combination: means supplying a signal having an intelligence component of relatively low frequencies and a noise component, of relatively high freqencies, which may instantaneously exceed the intelligence component; a summing amplifier for giving an output determined by the sum of three inputs; a first integrator; means including an adjustable limiter for supplying the output of said amplifier to said first integrator; a second integrator; means supplying the output of said first integrator to said second integrator; means supplying said signal and the outputs of said integrators as inputs to said summing amplifier; and means adjusting the limits of said limiter in accordance with the output of said amplifier.

2. Apparatus of the class described comprising, in combination: means supplying a signal having an intelligence component of relatively low frequencies and a noise component, of relatively high frequencies, which may instantanenously exceed the intelligence component; a summing amplifier for giving an output determined by the sum of three inputs; a first integrator; means including an adjustable limiter for supplying the output of said amplifier to said first integrator; a second integrator, means supplying the output of said first integrator to said second integrator; means supplying said signal and the outputs of said integrators as inputs to said summing amplifier; and means adjusting the limits of said limiter in accordance with the rectified output of said amplifier.

3. Apparatus of the class described comprising, in combination: a summing amplifier for giving an output determined by the sum of three inputs; a first integrator; means, including a variable limiter, interconnecting said amplifier and said first integrator for supplying the output of said amplifier to said first integrator; a second integrator; means interconnecting said integrators for supplying the output of said first integrator to said second integrator; means interconnecting said amplifier and said integrators for supplying the outputs of said integrators as two inputs to said amplifier; input means connected to said amplifier for supplying a third input thereto; output means connected to said second integrator for taking an output therefrom; and means including a rectifier connected to said amplifier and said limiter for varying said limiter in accordance with the rectified output of said amplifier.

4. Apparatus of the class described comprising, in combination: summing means for giving an output determined by the sum of three inputs; a first integrator; means, including a variable limiter, interconnecting said summing means and said first integrator for supplying the output of said summing means to said first integrator; a second integrator; means interconnecting said integrators for supplying the output of said first integrator to said second integrator; means interconnecting said summing means and said integrators for supplying the outputs of said integrators as two inputs to said summing means; input means connected to said summing means for supplying a third input thereto; output means connected to said second integrator for taking an output therefrom; and means connected to said summing means and said limiter for varying the said limiter in accordance with the output of said summing means.

References Cited in the file of this patent

UNITED STATES PATENTS

| | | |
|---|---|---|
| 2,668,283 | Mullin | Feb. 2, 1954 |
| 2,684,468 | McClure et al. | July 20, 1954 |
| 2,685,682 | Sepahban | Aug. 3, 1954 |
| 2,722,677 | Krueger | Nov. 1, 1955 |
| 2,751,542 | Woodward | June 19, 1956 |
| 2,802,167 | Cooper | Aug. 6, 1957 |

OTHER REFERENCES

Book by Korn et al.: "Electronic Analog Computers," McGraw-Hill, New York, 1952 (page 101 relied on).

Book by Nixon: "Principles of Automatic Controls," Prentice-Hall, 1st printing October 1953 (pages 24, 33, 96 and 301 relied on).